BEST AVAILABLE COPY

Aug. 17, 1965  F. W. KUETHER  3,200,647
MEASURING APPARATUS
Filed Dec. 31, 1962

INVENTOR.
FREDERICK W. KUETHER
BY Robert O. Vidas
ATTORNEY.

3,200,647
MEASURING APPARATUS
Frederick W. Kuether, Minneapolis, Minn., assignor to Honeywell Inc., a corporation of Delaware
Filed Dec. 31, 1962, Ser. No. 248,690
6 Claims. (Cl. 73—329)

This invention relates generally to the field of temperature measurement. More specifically it relates to a device capable of continuously measuring by direct immersion the temperature of a molten bath, the bath being above the normal temperature range of the sensing device being used or being of such a nature as to dissolve or corrode the sensing device.

In the manfacture of high quality metals, steel for example, it is imperative that the temperature of the molten bath in the open hearth or electric furnace be maintained between certain well defined limits. Since the temperature of such a bath may well be 3000 F. or above, the problem has been to find a temperature sensor which will withstand the rigors of such an environment for a useful period of time. Optical pryometers and radiation pyrometers have been used but it is generally accepted that the immersion thermocouple is the simplest and most accurate device available for such use.

The use of a thermocouple to measure the temperature of such a molten bath is far from problem-free. Most conventional thermocouples utilize elements having a melting point which is far below the bath temperature, and even those elements which have a sufficiently high melting point often become inaccurate long before the melting point is reached. For example, the iron-constant thermocouple is accurate up to only about 1450 F. although the iron will not melt until 2800 F. is reached. In case of a platinum-platinum rhodium couple, the maximum reliable temperature is about 2700 F. and the platinum will melt at approximately 3100 F. Certain other platinum alloy elements have been developed which raise the useful upper limits some 50–100 F., but other problems remain. Measuring devices in general and thermocouple elements in particular tend to deteriorate rapidly when exposed directly to the corrosive or solvent action of a molten bath. Specifically, platinum and its alloys with rhodium deteriorate rapidly under reducing conditions at high temperatures by absorbing gases and metals reduced from the oxides of materials in contact with them. Silicon, as well as hydrogen and metallic vapors will contaminate them especially when reducing agents such as carbon and sulfur are present. Such reducing agents and contaminants are almost invariably found in molten baths.

It is true that other metallic thrmocouples have been developed which are accurate to much higher temperatures and are able to better withstand the effects of a reducing atmosphere. A tungsten-tungsten rhenium couple, for example, will measure temperatures up to 4500 F. and is also quite resistant to reducing atmospheres. Practically, its disadvantage has been the fact that it "burns" rapidly in an oxidizing atmosphere such as that found in a steel furnace.

Certain non-metallic thermocouple elements have also been developed. As an example, a carbon-carbon boron thermocouple has been found useful to 5600 F. Again the practical usefulness of such thermocouples in molten baths has been limited by their inherent bulkiness, fragility, and questionable reproducibility. The carbon also reacts to form carbides in many molten baths. The effect of such a reaction is either to change the calibration of the thermocouple or to destroy it completely.

It is clear from the prior art that the corrosive or solvent action of even a relatively low temperature molten bath will destroy a directly inserted thermocouple within a short period of time. For example, no solid is known which is completely insoluble in and resistant to the corrosive effects of a molten iron bath. Because of these effects, a .010 inch diameter platinum-platinum rhodium thermocouple which is inserted directly in a molten steel bath will be dissolved by the bath in less than four seconds. In the steel industry, it is therefore common to use disposable thermocouple elements. After each reading, the used element is discarded and is replaced with a new element. In a lower temperature bath, the elements may withstand a certain amount of repeated usage but their gradual contamination will require recalibration of the device before each use. Either type of temperature measurement is obviously expensive, and continuous readings are impossible to obtain.

In an attempt to increase the useful life, the thermocouple elements are often enclosed in a protective casing. These casings are manufactured either from special alloys or from somewhat inert refractory materials in order to best withstand the particular environment to which they are being subjected. At best, a protective casing interferes with ideal temperature measurement by reducing the sensitivity and slowing the speed of response. A metal casing will invariably react to some extent with a molten bath and the purely corrosive effects of such a bath will eventually destroy the casing even though the melting point of the casing is far above the temperature of the bath. A non-metallic casing manufactured from porcelain or a ceramic material is often used because of the relatively inert qualities of these materials. The use of this type of casing is limited not only in that mechanical stresses are set up in the material due to the extreme temperature changes involved but also in that these ceramic materials are never completely insoluble in molten metals. The stresses can cause cracking of the casing and subsequent destruction of the thermocouple and in addition, furnace gases sometimes leak through the pores or cracks in the casing to cause contamination of the thermocouple. If silicon is present in the casing, the leakage of a reducing gas such as carbon monoxide will cause rapid contamination of the thermocouple. The thermocouple used within the protective casing must also be capable of withstanding the full temperature of the bath, since the casing protects the thermocouple from the corrosive effects of the bath but not from the temperature per se.

The present invention discloses a temperature measuring system for use in molten baths which overcomes the problems previously discussed and provides for continuous monitoring of the bath temperature. A thermocouple or other temperature sensing device is imbedded within a solid block which is composed of a material substantially identical to that found in the bath. The block protects the thermocouple from the effects of direct contact with the bath. To prevent the block from being completely melted or dissolved into the bath, a cooling fluid is pumped through a hollow chamber within the block. The cooling fluid keeps the block at a temperature below its melting point. Since at least the surface of the block is composed of the same material as that of the bath, the two are compatible and the solvent action which usually occurs between the block or casing and the bath is not present. The surface of the block will exist at a distance from the cooling core determined by the reaching of an equilibrum point at which the amount of heat being absorbed by the block is equal to the amount being removed by the cooling fluid. To better understand the relationship between the elements present in the system, the case of a simple iron bath will be considered. Assume that the bath is at 3500 F. and that sufficient cooling fluid is pumped to keep the core of the iron block at 200 F. Although the melting point of iron is 2800 F. the block will not entirely melt into the bath because of the heat being removed by the cooling fluid. An isothermal surface will be formed about the cooling core which is roughly equidistant from the cooling core. The distance of this surface from the cooling core will depend upon the relative temperatures of the bath and the cooling core and upon the thermal conductivity of the block. The hotter the bath, the closer the surface will move towards the core due to dissolution, other variables being held constant. The configuration of the outer surface of the block will depend upon the heat transfer characteristics of the block, the shape of the cooling core and the presence or absence of convection currents within the bath. Since an iron block is immersed in an iron bath, the surface of the block will reach equilibrium at some point where the cooling is balanced by the heat absorbed and the surface will be at a temperature equal to the melting point of iron, 2800 F. A thermocouple which is imbedded within the block so as to be out of direct contact with both the cooling coil and the surface of the block will sense a temperature on the gradient between the 200 F. core and the 2800 F. surface. In this particular situation the sensed temperature will be maintained below 2700 F., the maxium reliable temperature where a platinum-rhodium thermocouple is used. Since the core temperature is fixed, the thermocouple position is fixed, and the surface temperature is fixed, the variable which causes a change in temperature at the thermocouple is the distance of the surface from the core, this distance being changed as a result of changes in bath temperature. The temperature being sensed by the thermocouple will have a determinable relationship to the bath temperature and the system can be calibrated accordingly.

Although the above example was discussed with respect to a simple iron bath, the same system can be employed in any bath in which at least one definable component will change from liquid to solid at a determinable temperature. In a bath of a relatively pure material such as iron, aluminum or lead, there is no problem since the melting temperature is easily ascertained and will not change. In a bath containing two or more materials, such as an alloy bath, the same parameters apply. The cooled block is composed of a material substantially identical to that of the bath and at least one of the materials must undergo a change in phase at a determinable temperature. Since this change in phase will take place at the surface of the block, the surface temperature will be a known constant.

To illustrate the application of these principles to such a situation, assume that the bath is composed of 87% lead and 13% antimony. This is an eutectic solution which will change from the liquid state to the solid state at 475 F. without a change in composition. The surface of the Pb-Sb block will thus be maintained at 475 F. although the bath temperature may be much higher. If, however, the composition of the bath is changed to 25% lead and 75% antimony, a different result obtains. There is no longer a eutectic solution and only antimony will freeze out as the temperature is lowered, at least until the 87% Pb-13% Sb liquid composition is reached. As a practical matter, the size of the bath will be extremely large as compared to the size of the block and the small amount of antimony being plated out on the block will not appreciably change the 25% Pb-75% Sb ratio. At this ratio, antimony will plate out at 930 F., again determining the temperature of the block surface. Although the 930° F. surface temperature of the block remains constant, the sensor temperature must change with bath temperature change as a result of solidification or melting of the block.

The same principles apply to measurement of the temperature of a molten bath of non-metallic material. A sample of this type of system is to be found in the process of case hardening steel parts. The steel parts are immersed in a molten bath of sodium cyanide (NaCN) which reacts with the steel to form an extremely hard nitrified surface. For best results, the NaCN bath must be maintained at a predetermined temperature. The measurement of this temperature is difficult because of the extremely corrosive effects of the molten salt. A directly inserted thermocoupler or the usual protective casing will deteriorate rapidly in the presence of molten NaCN. To apply the principles of the present invention to this application is relatively simple. A cooling core is formed from a solid material such as steel and a block of solid NaCN is cast around it and the thermocouple. The corrosive effect of the solid NaCN is small as compared to the liquid. When the cooled NaCN block is immersed in the molten bath, the outer surface of the block will melt until the equilibrium point between the heating of the bath and the cooling of the core is reached. The temperature of the surface of the block will then be 1020 F., the melting point of NaCN.

For calibration purposes, it is not absolutely necessary that the temperature of the surface of the block be known as long as it is known that the temperature is constant. This temperature will be constant as long as the relative percentages of the components in the bath remain constant and a change in phase of at least one of the components is occurring.

While the discussion thus far has been confined to examples of those systems in which the bath material undergoes a definite change in state at a predetermined temperature, it should be understood that the same techniques will apply to measuring the temperature of those materials which do not undergo a change in state in the classical sense. It is well known that a molten glass bath will destory a thermocouple as rapidly as will a molten metal bath. The present invention is applicable to use in such a bath in spite of the fact that glass undergoes a change in viscosity rather than a change in state as the temperature changes. The thermocouple is again imbedded in a cooled block of solid glass which in turn is immersed in the molten glass bath. If the viscosity will undergo a rapid change at a definite temperature with the type of glass being used, the system will operate as if a true change in state similar to that found in a metal bath had occurred. If the glass is such that the viscosity change is very gradual with the change in temperature, it may be impossible to discern a definite boundary between the solid block and the liquid bath. In such a case, the thermocouple will indicate a temperature which is a measurement of the rate of heat flow from the bath to the cooling core.

It is therefore a primary object of the present invention to provide a pyrometric type temperature sensing device which is capable of measuring continuously the temperature of a molten bath by direct immersion therein.

A further object is to provide a temperature sensing device having a solid protective casing composed of a material substantially identical to the material of the bath being measured to thereby eliminate adverse chemical reaction between the casing and the bath.

A still further object is to provide a temperature sensing device having a solid protective casing, a temperature sensor imbedded within said casing and a cooling chamber at the core of the casing to prevent the block from being dissolved by the bath being measured and to decrease the temperature to which the sensor is subjected.

Other objects of this invention will be apparent from the specification and claims when considered in connection with the accompanying drawings in which:

Figure 1:
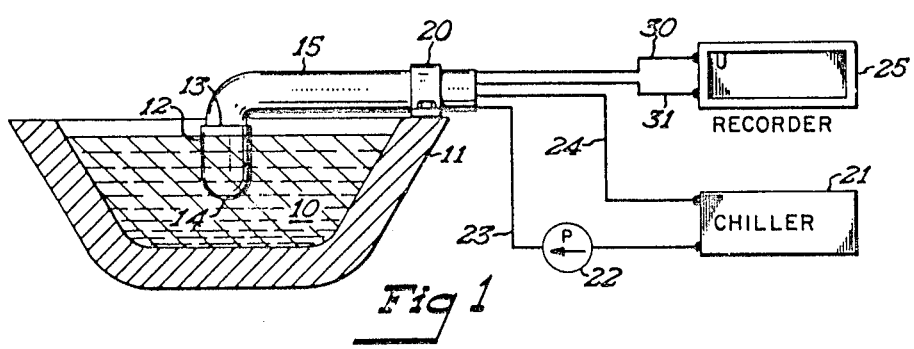
FIGURE 1 is a schematic drawing of a typical system utilizing my invention.

Referring now to the drawing there is illustrated in FIGURE 1 a schematic representation of a typical system utilizing the subject temperature sensor. A bath 10 of a molten material is contained within a retort 11 composed of a refractory material. Bath 10 is maintained at a uniformly high temperature above the melting point of the bath material by an open hearth furnace, an electrical arc furnace, or other heating means (not shown). The material in bath 10 could be iron, steel, aluminum, glass or any other material which requires processing in a molten bath during some phase of the manufacturing process. Immersed within bath 10 is a temperature sensor 12 which is the subject of the present invention. Temperature sensor 12 is a block of solid material, the composition of which is substantially identical to that of bath 10. Sensor 12 has a generally cylindrical configuration including a flat first end 13 and a convex hemispherical second end 14. Second end 14 of sensor 12 is inserted into bath 10 to a depth sufficient to penetrate below any layer of slag which might cover bath 10. A bracket member 15 is provided to hold sensor 12 at a fixed position in bath 10. Bracket 15 is composed of a ceramic or refractory material which is able to withstand the high temperatures present above bath 10. A clamp member 20 which is firmly affixed to retort 11 holds bracket 15 in place.

To provide a continuous flow of a cooling fluid through sensor 12, a chiller 21 is provided. Chiller 21 is the evaporator of a standard mechanical refrigeration system. A pump 22 forces the cooling fluid through a cooling system which includes chiller 21, a pipe 23, sensor 12, and a pipe 24 to return the fluid to chiller 21. Pump 22 will provide a constant flow of cooling fluid, and suitable control means must be provided on the mechanical refrigeration system to maintain the cooling fluid supply at a constant temperature.

To provide a continuous record of the temperature being sensed by sensor 12, a recording instrument 25 is connected by a pair of wires 30 and 31 to a thermocouple or other temperature sensing device imbedded in sensor 12.

Figure 2:
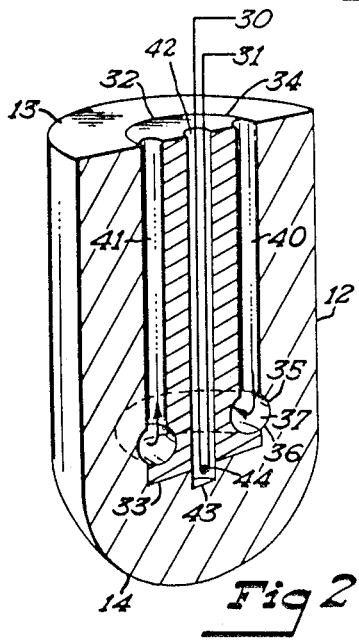
FIGURE 2 is a three dimensional view of a 180° vertical cross section of the preferred embodiment of my invention.

In FIGURE 2 there is disclosed a three dimensional view of a 180° cross section of the preferred embodiment of my invention. The interior elements of sensor 12 are clearly set forth to illustrate more fully the operation of sensor 12 in conjunction with the system disclosed in FIGURE 1. It is again noted that sensor 12 or at least the surface thereof is composed of a material substantially identical to that of the bath material. Formed within sensor 12 along the longitudinal axis is a bore 32 having a cylindrical configuration. Bore 32 provides an opening from end 13 into which the previously mentioned cooling means and temperature sensing means can be inserted. Bore 32 terminates at a flat closed end 33 which is adjacent hemispherical end 14. The distance of end 33 from hemispherical end 14 is approximately equal to the depth of the metal surrounding bore 32. A metal core 34 is press fitted into bore 32. Metal core 34 is cylindrical in shape, having the same dimensions as bore 32. An annular groove 35 is formed in the surface of bore 32 at a point near end 33. Groove 35 is cut normal to the axis of bore 32 and thus protrudes slightly into the surrounding metal. A corresponding concave annular groove 36 is formed around the periphery of core 34 so that when core 34 is inserted in bore 32, an annular chamber 37 having a circular cross section is formed normal to the axis of the bore and concentric with the outer surface of sensor 12. To provide access to chamber 37 from the exterior of sensor 12, a pair of tubes 40 and 41 are formed longitudinally on diametrically opposing sides of core 34. Tubes 40 and 41 each have a first end opening into chamber 37 and a second end terminating in an opening on end 13. A loop consisting of tube 40, chamber 37, and tube 41 is thus provided to carry a flow of cooling fluid through the center of sensor 12.

Another tubular bore 42 is formed along the longitudinal axis of core 34. Bore 42 extends throughout the length of core 34 and has openings at either ends thereof. A small cylindrical well 43 is also formed at the center of end 33. Well 43 extends a short distance into the metal end 13. Well 43 extends a short distance into the metal of sensor 12 and provides an extension of bore 42. Carried within bore 42 are a pair of wires 30 and 31 which are composed of dissimilar metals and correspond to the wires 30 and 31 in FIGURE 1. The wires are welded together to form a thermocouple 44 which is positioned in well 43. Thermocouple 44 is protected from the corrosive effects of bath 10 by the surrounding metal block. The temperature sensed by thermocouple 44 is on the gradient between the temperatures of the cooling chamber 37 and the outer surface of sensor 12.

Figure 3:
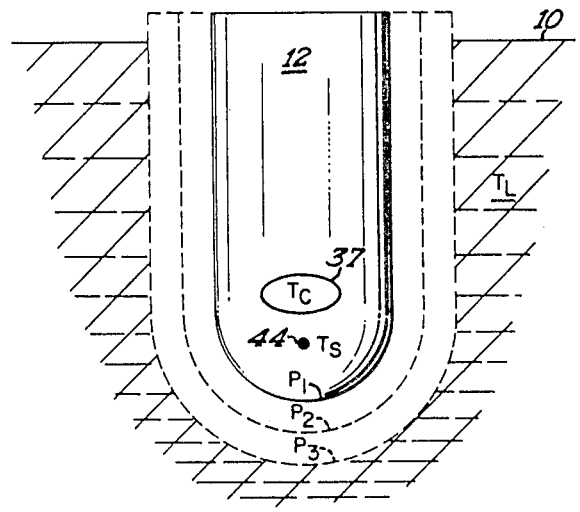
FIGURE 3 is a schematic representation of the subject temperature sensor showing the relationship of the elements under varying bath temperatures.
Figure 4:
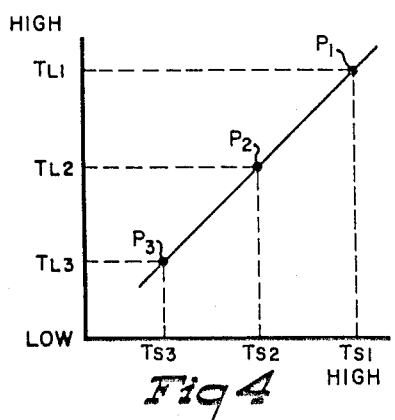
FIGURE 4 is a graph based upon the relationships disclosed in FIGURE 3 for converting sensed temperature to bath temperature.

To better explain the operation of the temperature sensor disclosed in FIGURE 2, FIGURES 3 and 4 will now be considered. FIGURE 3 is a schematic representation of the elements contained in sensor 12 which shows their relationship when subjected to three different bath temperatures. Tc represents a constant temperature cooling sink which corresponds to chamber 37. Ts represents the location of a temperature sensing element which corresponds to thermocouple 44. P1 represents the location of the outer surface of sensor 12 when exposed to the highest temperature of bath 10. P2 represents the location of the surface when exposed to a lower temperature bath. P3 represents the location of the surface when exposed to the lowest temperature of bath. TL represents the temperature of bath 10. Since the material of sensor 12 is substantially identical to that of the bath, the material will solidify onto the surface of sensor 12 as the bath temperature decreases and will melt from the surface of sensor 12 as the bath temperature increases. The temperature of the surface will always be equal to the melting point of the bath material even though the bath temperature be much higher. Ts acts as a temperature divider and will sense a temperature on the gradient between Tc and either P1, P2 or P3. Since the temperature at each of these surfaces P1, P2 and P3 is always equal to the melting temperature of the bath material, the only variable in the system is the distance from Ts at which the surface forms. With the surface formed at P1 for example, it is apparent that Ts will be much higher than with the surface formed at P3.

Referring now to FIGURE 4, there is illustrated a graph for converting the temperatures sensed at Ts to the bath temperature TL. This graph is presented for illustrative purposes only since the relationship between Ts and TL will change depending upon the type of bath in which the device is used. A linear relationship will normally exist between Ts and TL although the slope of the curve will change for different applications. In this example, Ts is plotted on the abscissa of the graph and TL is plotted on the ordinate. The high value of Ts corresponds to the high value of TL. For any temperature Ts taken from recorder 25, there will be a corresponding value for TL available from the graph.

It should be clear that the exact configuration of sensor 12 is not critical since the final shape will be determined by the action of the bath after sensor 12 is inserted therein. The surface of sensor 12 will vary depending upon the configuration of the cooling core, the heat transmission characteristics of the block, and the presence or absence of convection currents within the bath. The exact configuration of the cooling core is not critical. In some applications a simple loop formed in the tube carrying the cooling fluid may be sufficient. Neither is the exact location of the thermocouple critical. The preferred location is along the axis of the sensor but in some applications any position within the block which is out of direct contact with the cooling core and the surface will suffice.

From the above description, it will be apparent that I have invented a temperature sensor having new and more effective means for measuring the temperature of a molten bath by direct immersion therein. Although the form of the invention described herein constitutes a preferred embodiment, it will be understood that changes may be made within the spirit of the invention limited only by the scope of the appended claims.

I claim as my invention:

1. A device for continuously measuring by direct immersion the temperature of a molten metal bath, the metal being characterized by undergoing a change in state from liquid to solid at some predetermined temperature, comprising: a solid metal block having a composition substantially identical to that of the bath metal, said block having a generally cylindrical configuration including a flat first end and a convex hemispherical second end, said block having an annular chamber formed therein at a point intermediate from said ends in a plane normal to the axis of said block, a first and a second tube imbedded longitudinally in said block, the first ends of each of said tubes opening into diametrically opposing sides of said chamber and the second ends of said tubes separately opening onto said first end of said block, said tubes and said chamber providing a loop for the flow of a cooling fluid therethrough, fluid cooling means in cooperative relation with said loop for maintaining said loop at a first predetermined temperature below the melting point of said metal; and temperature sensing means imbedded within said block on the axis thereof at a point intermediate from said chamber and said second end of said block.

2. A device for continuously measuring by direct immersion the temperature of a molten metal bath, the metal being characterized by undergoing a change in state from liquid to solid at some predetermined temperature, comprising: a metal block having a composition substantially identical to that of the bath metal, said block having a chamber formed therein, a plurality of tubes imbedded in said block, a first end of each of said tubes opening into said chamber and a second end of each of said tubes extending from said block, said tubes and said chamber providing a loop for the flow of a cooling fluid therethrough, fluid cooling means in cooperative relation with said loop for maintaining said loop at a first predetermined temperature below the melting point of said metal; and temperature sensing means imbedded within said block to measure the interior temperature thereof.

3. A device capable of continuously measuring the temperature of a liquid, said liquid being characterized in undergoing at least a partial change in state from solid to liquid at a predetermined temperature, comprising: a block having at least the surface portion thereof composed of a material substantially the same as the solid of the bath, cooling means interiorly located in said block for maintaining said interior at a constant temperature below that of the bulk of the liquid; and temperature sensing means intermediate the cooled core and the external surface of said block, the surface of said block changing position relative to said temperature sensing means by alternate dissolution and solidification as the liquid temperature changes.

4. A device for continuously measuring the temperature of a bath of molten material by direct immersion therein, comprising: a solid block having at least a surface portion thereof composed of a material substantially the same as the composition of the bath; cooling means mounted within said block to cool the interior thereof to a temperature below the melting point of the bath; and temperature sensing means in said block at an intermediate position between said cooling means and said surface portion of said block.

5. A device for continuously measuring the temperature of a bath containing a mixture of molten metals by direct immersion therein, comprising: a solid block having at least a surface portion thereof composed of a material substantially the same as at least one of the constituents of the bath; cooling means mounted within said block to cool the interior thereof to a temperature below the melting point of the bath; and temperature sensing means in said block at an intermediate position between said cooling means and said surface portion of said block.

6. A device for continuously measuring the temperature of a molten bath by direct immersion therein, comprising: a solid body; cooling means in said body for cooling the interior thereof; and temperature sensing means mounted in said body in an intermediate position between said cooling means and the exterior surface of said body.

References Cited by the Examiner
UNITED STATES PATENTS

| 1,475,365 | 11/23 | Schueler | 73—355 |
| 1,563,104 | 11/25 | Pedersen | 73—343 |

ISAAC LISANN, *Primary Examiner.*